United States Patent [19]
Murphree

[11] 3,713,081
[45] Jan. 23, 1973

[54] GENERATION OF DOPPLERIZED, ASPECT DEPENDENT, HIGHLIGHTED SIMULATED ECHOES

[75] Inventor: Francis J. Murphree, Winter Park, Fla.

[73] Assignee: The United States of America as represented by the Secretary of the Navy

[22] Filed: April 16, 1971

[21] Appl. No.: 134,558

[52] U.S. Cl. .....................340/3 E, 35/10.4, 340/5 D
[51] Int. Cl. ...............................................G09b 9/00
[58] Field of Search ................340/3 E, 5 D; 35/10.4; 343/17.7

[56] References Cited

UNITED STATES PATENTS

| | | |
|---|---|---|
| 3,555,165 | 1/1971 | Ettenhoffer et al. ................35/10.4 |
| 3,471,858 | 10/1969 | Seyl et al. ...............................343/7.7 |
| 3,641,485 | 2/1972 | Murphree et al. .....................340/3 E |
| 3,609,671 | 9/1971 | Webster et al. .......................340/3 E |

*Primary Examiner*—Richard A. Farley
*Attorney*—Richard S. Sciascia, John W. Pease and Harvey A. David

[57] ABSTRACT

Sonar echoes are simulated with doppler effects characterized by frequency shifts proportional to the transmitted frequencies. Memory and logic means read in and store a digital representation of sonar signal at a set rate and then read out the signal at a rate determined by range rate of change. An aspect dependent echo highlight generator and an aspect dependent attenuator both utilizing digital techniques are described as part of the simulation apparatus.

6 Claims, 4 Drawing Figures

INVENTOR
FRANCIS J. MURPHREE

BY Harvey A. David
John M. ___

ATTORNEYS

INVENTOR
FRANCIS J. MURPHREE

BY Harvey A. David
John M. ...

ATTORNEYS

GENERATION OF DOPPLERIZED, ASPECT DEPENDENT, HIGHLIGHTED SIMULATED ECHOES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the art of sonar simulation and more particularly to improvements in the generation of signals simulative of echoes having characteristics dependent upon target aspect, target highlights, and doppler. The generation of such synthetic signals is useful in producing artificial targets for training purposes in conjunction with either operational or simulative sonar equipment. The generation of such signals is also useful in mobile target devices used for shipboard submarine tracking exercises or for decoys to lead an enemy anti-submarine unit astray. In the latter uses, doppler may or may not be necessary or desirable because the relative movement between the mobile target and the tracking vessel produces actual doppler effects.

Prior art doppler effects have been simulated by effecting a frequency translation corresponding to range rate. This has been satisfactory where the sonar pulses were discrete, narrow frequency band C.W. pings. However, with the increased use of wider band sonar, and particularly those employing FM slide, the use of frequency translation to simulate doppler is wholly inadequate. This is because doppler shift is proportional to frequency. In simple translation doppler simulation the frequency of the echo is produced by adding (or subtracting) one frequency corresponding to range rate to the frequency or frequencies of the outgoing pulse. The resulting frequency translation for all frequencies in an FM slide, for example, is not in proportion to each of those frequencies.

My copending application Ser. No. 94,134 filed Dec. 1, 1970, now U.S. Pat. No. 3,671,657 discloses improved apparatus for synthesizing echoes having aspect dependency and target highlight characteristics. In that disclosure the order of simulation is such as to approximate the echo length as equal to $2s/c \mid \cos \theta \mid + T$, where $s$ is the target length, $\theta$ is the aspect angle of the target, $c$ is the velocity of sound, and T is the insonifying pulse length. This does not take into consideration the target beam or diameter $d$. Because the diameter of a submarine is small compared to its length, the approximation is fully satisfactory for substantially bow or stern aspects but becomes less satisfactory as a beam aspect is approached.

SUMMARY OF THE INVENTION

With the foregoing in mind, it is a principal important object of this invention to provide improved apparatus for synthesizing signals simulative of sonar echoes.

Another object of the invention is the provision, in sonar echo synthesizing apparatus, of means for providing realistic doppler effects even for FM sonar simulation whereby the echo is characterized by doppler shifts which are proportional to the frequencies involved.

Yet another object of the invention is to provide means for synthesizing sonar echo signals which are characterized by the effects of target diameter as well as target length. In this regard it is an objective to provide aspect dependent simulated echoes wherein echo length $= (2s/c) \mid \cos \theta \mid + (2d/c) \mid \sin \theta \mid + T$ (Eq. 1)

As another object the invention aims to accomplish the foregoing through the provision of novel combinations of digital elements whereby apparatus embodying the invention may conveniently utilize recent advances in solid state digital arts which have provided reliable, compact, low power elements such as shift registers, converters, and the like.

Other objects and advantages of the invention will become apparent from the following description of an exemplary preferred embodiment when read in conjunction with the accompanying drawings.

DESCRIPTION OF THE PREFERRED EMBODIMENT

Figure 1:
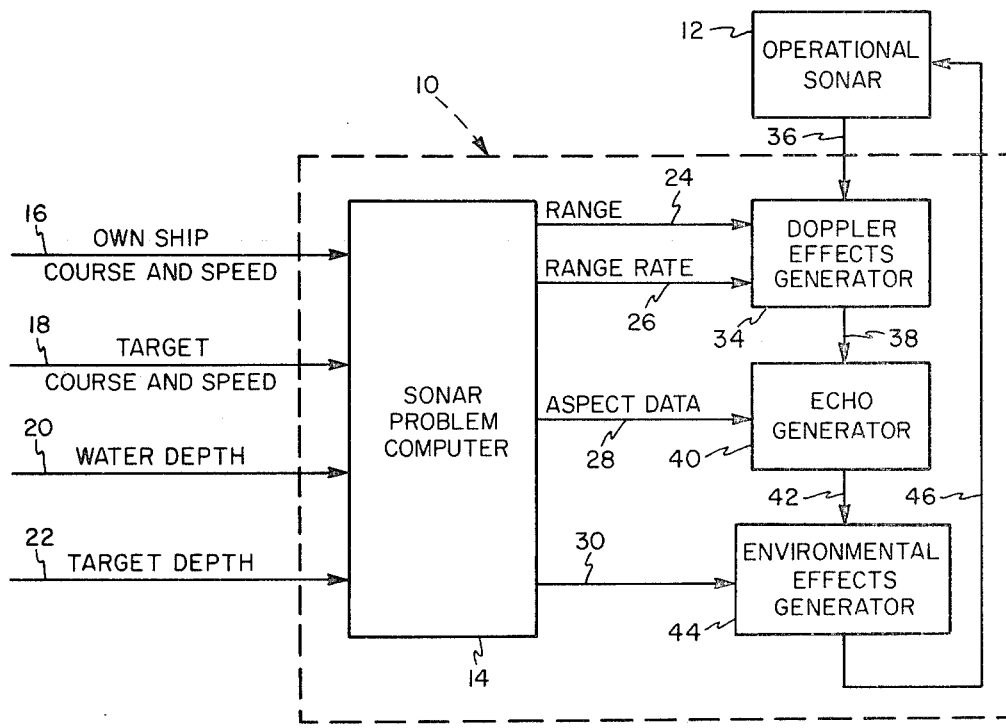
FIG. 1 is a diagrammatic illustration in block form of a sonar echo simulation apparatus embodying the invention and shown in conjunction with operational sonar equipment.

In the form of the invention illustrated in the drawings and described hereinafter, there is provided apparatus 10 which is useful in conjunction with sonar gear such as an operational type sonar 12 located aboard ship or at a shore station for purposes of training personnel in sonar operations or for equipment testing purposes. Briefly, the apparatus 10 comprises a sonar problem computer 14 which utilizes principles well known to those skilled in the art to convert problem variable inputs of own ship course and speed, target course and speed, water depth, and target depth represented by lines 16, 18, 20, and 22, respectively, into analog outputs of range, range rate, aspect angle functions, and attenuation factor represented by lines 24, 26, 28, and 30, respectively.

The apparatus further comprises a doppler effects generator 34 which receives as inputs the range and range rate outputs on lines 24 and 26 of the computer 14, and also receives via line 36 a sonar transmission pulse which may be the form of a pulse, an FM slide, or other form of modulated sonar pulse. The doppler effects generator, which forms an important part of this invention, will later be described in more detail with reference to FIG. 2. Suffice it to say for this brief description that the doppler effects generator is responsive to range rate information signals to produce synthetic doppler shift in the sonar pulse signal wherein the extent of shift for any frequency within the sonar pulse is proportional to that frequency. This is particularly important in simulation of FM sonar echoes.

The doppler shifted output of the doppler effects generator 34 is represented by line 38 and is applied to an aspect dependent echo generator 40. The echo generator 40 may be of conventional construction, may be of the character described in copending application Ser. No. 94,134, but is advantageously of the improved construction described more fully hereinafter with reference to FIG. 3.

The output of the echo generator 40, represented by line 42, is applied to an environmental effects generator 44. The generator 44 may introduce factors such as ocean noise, attenuation as related to depth and/or suspended matter, reverberation effects, multi-path conditions, and the like.

The generator 44 forms no part of the invention per se except as it is a desirable component in the system or apparatus 10. The effects of reverberation and multi-path may be generated by generator 44 in accordance with the teachings of U. S. patent application = No. 740,815 filed June 18, 1968 and/or copending application Ser. No. 117,585, filed Feb. 22, 1971, and entitled SONAR MULTIPATH SIMULATOR. The output of the environmental effects generator 44 is fed as shown by line 46 to the operational sonar 12 where it is processed as an electrical signal by the sonar just as though it were a signal derived from a hydrophone. Of course in some training applications a sonar simulator may be substituted for the operational equipment 12.

Figure 2:
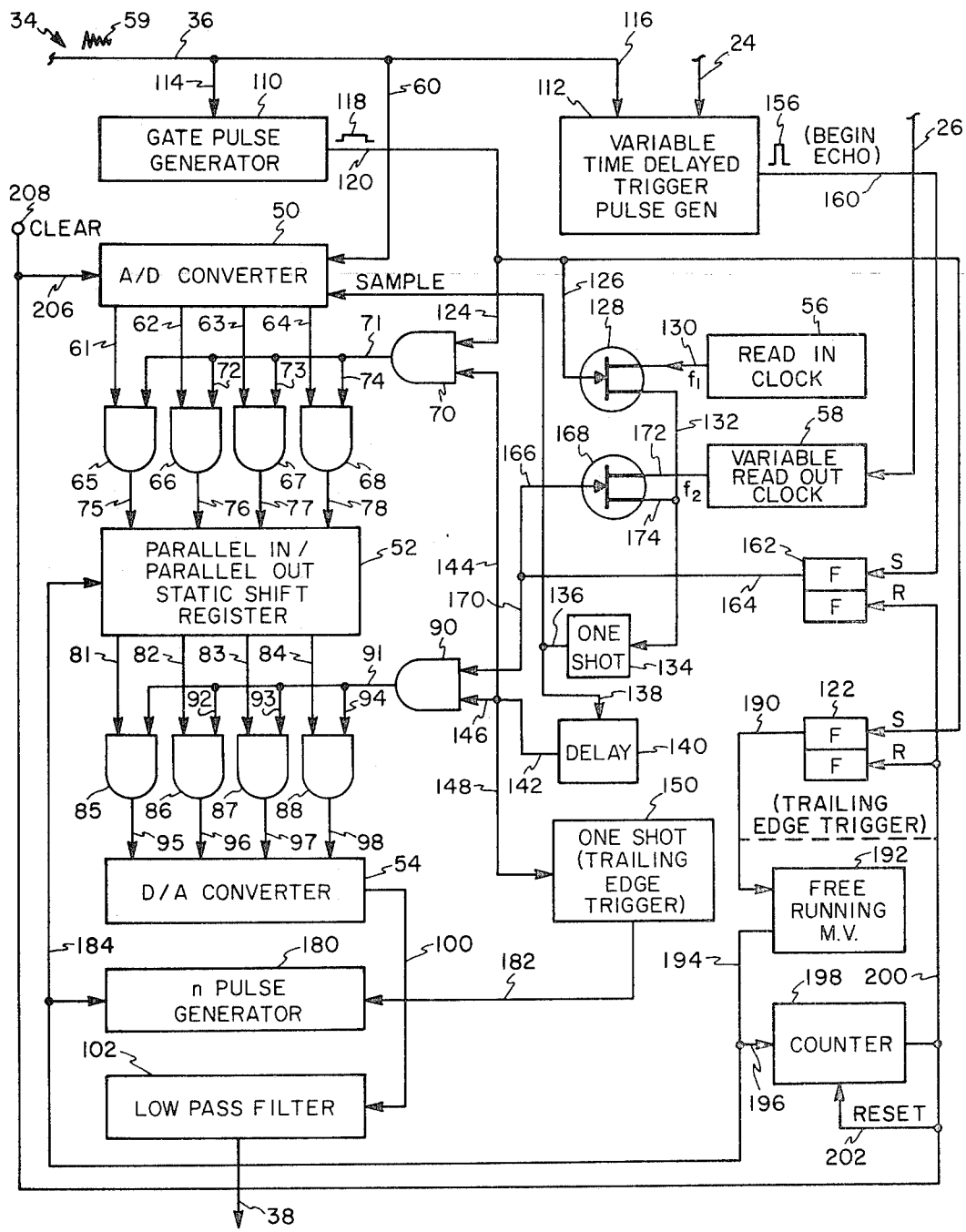
FIG. 2 is a diagrammatic illustration in block form of a doppler effects generator circuit according to the invention and forming part of the simulation apparatus of FIG. 1.

Referring now to FIG. 2, there is shown the doppler effects generator 34 wherein doppler simulation is achieved by converting the transmitted sonar signal to digital form, reading it into a memory means at a first predetermined rate, reading it out of the memory means at a different rate determined by rate of change of range, and reconverting the read-out to analog form for processing by the echo generator 40. Thus, the generator 34 comprises, in general, an analog to digital converter 50, a parallel-in parallel-out static shift register 52, a digital to analog converter 54, a read in clock 56 for controlling the predetermined frequency $f_1$ of read in to the register and a variable read-out clock 58 for controlling the read out of the register at a frequency $f_2$ determined by the range rate input via line 26. The ratio of the read in clock frequency to the read out clock frequency may be expressed as:

$$f_1/f_2 = (f_s + f_d)/(f_s),\qquad \text{Eq. 2}$$

where $f_s$ is the lowest transmitted signal and $f_d$ is the required doppler shift at this frequency. The stored signal is read out at a time beginning at 2R/C seconds, where R is the range from the sonar to the target and C is the velocity of sound. If there is no relative movement between own ship and target then the read out clock 58 generates a frequency $f_2 = f_1$, and the reconstructed signal has the same frequency content as the applied signal. If there is relative motion, $f_2$ is either greater or less than $f_1$ depending upon the sense of the motion. In the present example the read out clock 58 comprises a voltage controlled oscillator and the own ship to target range rate information is a proportional voltage with system scaling such that Equation 2 prevails. Doppler can, of course, be positive or negative, and "read in" and "read out" are used in a manner analogous to "speed" in magnetic recording, i.e., if the playback speed of a magnetic recorder is less than or greater than the recording speed the frequency components of the original input signal are shifted proportionately.

The analog to digital converter 50 is connected by line 60 to receive the sonar signal 59 from input line 36 and has a plurality of parallel output lines 61, 62, 63, and 64 connected to provide one input to a corresponding one of a plurality of AND gates 65, 66, 67, and 68. The other input to each of these gates is derived from an AND gate 70 as shown by lines 71, 72, 73, and 74. The AND gates 65, 66, 67, and 68 are respectively connected by parallel input lines 75, 76, 77, and 78 to the shift register 52.

Parallel output lines 81, 82, 83, and 84 of the register 52 are connected as first inputs to a plurality of AND gates 85, 86, 87, and 88. The other input to each of these gates is derived from an AND gate 90 as shown by lines 91, 92, 93, and 94. The AND gates 85, 86, 87, and 88 have their outputs respectively connected by parallel lines 95, 96, 97, and 98 to the inputs of the digital to analog converter 54. The output of the converter 54 is passed, as shown by line 100 to a low pass filter 102 the output of which on line 38 is the doplerized output of the doppler effects generator 34. The AND gates 70 and 90 form part of timing control circuitry of the generator 34, which circuitry will be described as this specification proceeds. While four parallel paths are shown from the A/D converter 50 to the register 52 and from the register 52 to the D/A converter 54, these are by way of example and it is not intended that the converters 50, 54 and register 52 be limited to four bit values.

The just mentioned timing circuitry comprises a gate pulse generator 110 and a variable time delayed trigger pulse generator 112, each connected to receive the sonar signal 59 as shown by lines 114 and 116. The gate pulse generator generates a gate pulse 118 which begins with the sonar signal 59 and is slightly longer than that signal. The gate pulse is applied as shown by line 120 to the set terminal of a flip-flop 122, by line 124 as one input to the AND gate 70, and by line 126 to the gating or control element of a field effect transistor 128 which is normally in an off or non-conductive state. The transistor 128 serves, when energized, to connect the read in clock 56 output via lines 130, 132 to a single shot multivibrator or one shot 134.

The one shot 134, which serves to shape the output signal of the clock 56 to a train of pulses at the clock frequency, has its output connected as shown by line 136 to the sample command terminal of the analog to digital converter 50, and by line 138 to a fixed delay means 140. The output of the delay 140 is connected as shown by lines 142, 144 to provide the second input to AND gate 70. Additionally the delay 140 output is connected by line 146 to one input of the AND gate 90, and by line 148 to the input of a one shot 150 which is selected to trigger on the trailing edge of each input pulse for a purpose which will presently be made apparent.

The variable time delayed trigger pulse generator 112 is responsive to initiation of the sonar signal 59 and to the range input via line 24 to provide a trigger signal 156 which initiates the beginning of the read out and conveniently does so at a time which will result in an echo return time corresponding to the problem range. The trigger signal 156 is applied as shown by line 160 to the set terminal of a flip-flop 162, the output of which is fed via lines 164, 166 to the control terminal of a field effect transistor 168. The output of the flip-flop 162 is further applied via line 170 as the other input to the AND gate 90.

The transistor 168, which is normally off or non-conductive, serves, when energized, to connect the output of the variable read out clock 58 via lines 172, 174, and 132 to the previously described one shot 134. At this point it may be noted that the clock 58 is conveniently in the form of a voltage controlled oscillator and the input on line 26 an analog voltage representing range rate of change.

The timing circuitry further comprises an n pulse generator 180 which is fed the output of the one shot 150 via line 182. The generator 180 provides an output of n output pulses for each pulse received and feeds these output pulses as shown by line 184 to the shift command terminal of the register 52.

The flip-flop 122 is of the type that triggers on the trailing edge of the input thereto via line 120 and when so triggered renders an output condition on line 190 which starts a free running multivibrator 192, the output of which is connected by line 194 and line 184 to the shift input of the register 52. Additionally, the output of the multivibrator 192 is connected via line 196 to a counter 198.

The counter 198 provides an output to line 200 after a predetermined count, which output on line 200 is applied to the reset terminal of flip-flop 162, via line 202 to the reset terminal of the counter, and via line 206 to the reset terminal of the analog to digital converter 50. The purpose of flip-flop 122, the multivibrator 192 and the counter 198, together with their associated connections is to bring data in the register 52 to position for immediate read-out as will be pointed out later.

After the apparatus has been turned on and an initial clear signal applied to a terminal 208, operation will be as follows.

The sonar generates a sonar signal 59 on line 36. This signal is applied to pulse generator 110, causing it to generate a slightly longer gate signal 118 that is applied to the gate of transistor 128, turning it on and thus connecting the read in clock 56 to the one shot 134. The output of the one shot 134 is fed to the A/D converter 50 causing it to sample the sonar signal. The output of the one shot 134 is also connected through the delay network 140 to one input of the AND gate 70, the other input to which is the gate signal from pulse generator 110. As long as this gate signal remains "on" the output of the A/D converter 50 is read into the parallel-in parallel out shift register 52 each time the one shot 134 triggers; i.e., each time a data sample is read. It should be noted here that the "on" period of the one shot 134 is selected to be only as long as is necessary to transfer data in and out of the shift register 52. It should also be noted that the delay 140 is necessary only on read in to the register. It (the delay) allows the A/D converter 50 output to reach its final value for each sample before transferring it into the shift register.

After each sample is read into the shift register, the one shot 150 triggers on the trailing edge of the read-in pulse causing the n pulse generator 180 to rapidly shift the data in the register 52 *n* places where *n* is the number of bits in the A/D converter output. This leaves the input stages of the shift register in condition to accept the next data sample.

The *n* pulse generator 180 can conveniently comprise a combination of a free running multivibrator, a counter and a flip-flop, the last when triggered to its set condition would turn on the multivibrator which after *n* cycles would cause the counter to trigger the flip-flop off, ending the operation. Such combinations, as well as others which will perform the function of the *n* pulse generator, are well known to those skilled in the art to which the invention pertains and need not be further described herein. The interval required for generator 180 to generate the *n* pulses must be less than the time remaining after data read in and the occurrence of the next sampling pulse from the one shot.

The total capacity of the shift register must be slightly greater than the maximum number of data samples that will be fed into it for reasons that will become apparent.

At some time after the shift register has been loaded (depending upon the problem), the generator 112 will generate the pulse 156 that will cause readout of the register to begin, the read out rate being determined by the variable read out clock 58. This is accomplished as follows: The "begin echo command" (the pulse 156 referred to above) is applied to the set input of flip-flop 162 causing a logical 1 to appear at its output 164, turning on transistor 168 (transistor 128 is now off) hence connecting the output of the read out clock 58 to the input of the one shot 134. The "1" output of the flip-flop 162 is also applied as an input to the AND gate 90. The other input to this gate comes from delay network 140. Each time that the one shot 134 triggers, the data appearing at the output of the shift register 52 on lines 81 – 84 is read into the digital to analog converter 54 through AND gates 85 – 88. The output of the converter 54 is fed to the low pass filter 102 and thence to the echo generator.

As mentioned above, the capacity of the shift register 52 is made greater than required by the longest pulse that must be stored. This simplifies the particular method chosen to make the stored data almost immediately available at the register output when the "begin echo command" occurs. Operation is as follows: The trailing edge of the echo gate pulse 118 from pulse generator 110 triggers the flip-flop 122 to the set condition; the logical 1 appearing at its output 190 turns on the free running multivibrator 192 whose output is fed via lines 194 and 184 to the shift input of the register 52 causing it to continue to shift its data toward its output terminals after the output of the n pulse generator has ceased. Counter 198 keeps track of the total number of shift pulses applied. When the sum of those occurring during data storage plus the ones generated by the multivibrator 192 places the first data sample in the register 52 in a position to be read out, counter 198 generates a pulse that triggers the flip-flop 122 off, stopping the free running multivibrator 192. Note that on read out, the flip-flop 162 keeps the field effect transistor 168 "on" until the total number of shift pulses applied to register 52 and to the counter 198 is equal to the shift register capacity, at which time counter 198 resets and causes transistor 168 to turn off. This results also in clearing the shift register 52 for the next sequence.

Note that all circuits that must be set to zero or a set condition are so set initially by an initial clear signal applied in any suitable manner to terminal 208, and thereafter by the output of the counter 198.

Figure 3:
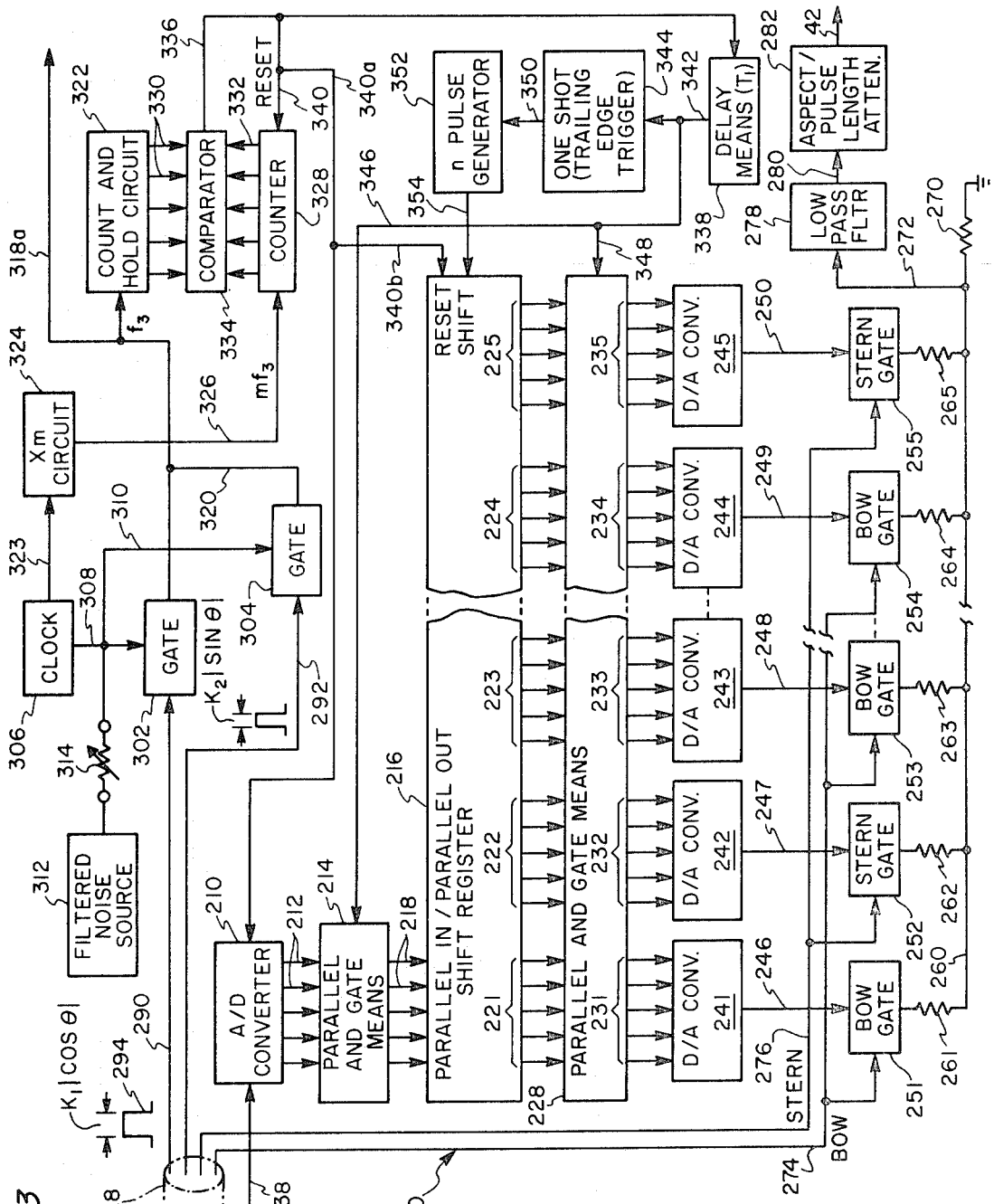
FIG. 3 is a diagrammatic illustration in block form of an echo generator circuit according to the invention and forming part of the apparatus of FIG. 1.

Referring to FIG. 3, the improved, aspect dependent echo generator 40 will be described. Briefly, the generator 40 has as its purpose the generation of a synthesized echo from the reconstituted dopplerized signal on line 38, which synthesized echo will have a length according to Eq. 1, supra.

The generator 40 comprises, in general, an analog to digital converter 210 which converts the incoming signal on line 38 to a digital form of say five bits. The converter 210 is connected as shown by lines 212 to parallel AND gate means 214 which controls passage of the digital output of the converter to a parallel in, parallel out shift register 216 as shown by lines 218.

The shift register is operated to introduce appropriate delays to the digital data, to correspond to desired highlights along the simulated target length. The shift register outputs, represented by groups of lines 221, 222, 223, 224, 225, are connected to parallel AND gate means 228 for passage as shown by groups of lines 231, 232, 233, 234, and 235 to corresponding digital to analog converters 241, 242, 243, 244, and 245.

Each of the just mentioned digital to analog converters is connected to either a bow or a stern gate. Thus the converters 241 – 245 are connected by lines 246 – 250 to gates 251 – 255 which are, alternately, bow and stern gates. These gates are connected to a common conductor 260 by resistors 261, 262, 263, 264, and 265, the conductor 260 being connected through a resistor 270 to ground so that the voltage seen across resistor 270 on lines 260 and 272 will represent a summation of the current conditions in the resistors 261 – 265. The gates 251 – 255 are selectively enabled by bow or stern aspect signals applied via lines 274, 276. These signals are part of the aspect data collectively indicated at 28.

The line 272 is connected to a low pass filter 278 which is in turn connected by line 280 to an aspect/pulse length attenuator 282, later described in more detail with reference to FIG. 4. The output of the attenuator 282 is taken on line 42 as the output of the generator 40.

The operation of the gate means 214, 228, and the shifting of the register 216 are effected by signals from timing circuitry which has as its respective inputs on lines 290 and 292 a pulse 294 having a time width proportional to $K_1 / \cos \theta$ and a pulse 296 having a time width proportional to $K_2 / \sin \theta$. These pulses are applied as enabling signals to gates 302 and 304 and are part of the aspect data collectively indicated at 28.

A clock 306 provides a clock frequency $f_3$ as shown by lines 308 and 310 to the gates 302, 304 while a filtered noise source 312 provides filtered noise signals to those gates via a variable resistor 314 and lines 316, 308 and 310. The outputs of the gates 302, 304 are applied as shown by lines 318, 320 to a count and hold circuit 322.

The clock 306 also provides $f_3$ via line 323 to a multiplier circuit 324 which multiplies the frequency $f_3$ by a factor of $m$ to provide an output on line 326 of a frequency $mf_3$. The frequency $mf_3$ is applied to drive a counter 328. The counts in circuit 322 and in counter 328 are preferably digital and are represented by lines 330, 332, respectively, going to a comparator 334 which is operative to compare the counts and to provide an output pulse on line 336 when the count in counter 328 reaches the count in circuit 322.

The comparator output is applied as shown via line 336 to a delay means 338, and also via lines 340, 340a and 340b to reset the counter 328, the converter 210, and the register 216. The delay means 338 has its output connected via line 342 to a single shot multivibrator or one shot 344 which is characterized by being triggered by the trailing edge of the input thereto. The delay means 338 further has its output connected via lines 346 and 348 to the AND gate means 214 and 228. The output of the one shot 344 is applied as shown by line 350 to an $n$ pulse generator 352 which generates on line 354 $n$ pulses for each input pulse received from the one shot 344. The output of the $n$ pulse generator on line 354 is applied to the shift input terminal of the register 216 and serves to effect shifting thereof in groups of $n$ pulses.

It will be recognized that each of the groups of shift register taps 231 – 235 with each of the associated digital to analog converters 241 – 245 represent a target highlight characteristic resulting from some structural anomaly along the length of the target. While only five such highlights are shown, it is intended, as indicated by the break between the third and fourth highlight representations, that any number of such highlights may be simulated. The taps along the register 216 (which serves as a delay line) must be made at points where a complete digital number is available.

The maximum delay required of the shift register, in the present application, is approximately 2S/C seconds. This is the case when the aspect angle $\theta$ is 0° so that $\theta = 1$. The total number of bits required in the register is equal to 2S/C times minimum sampling rate times the number of bits per sample used to define the sample amplitude. Assume, for example, that the minimum sampling rate is 12KHz and that 5 bits are used to define the amplitude of each sample. Further assume that $2S/C = 0.2$ sec. The required shift register capacity would then be 12,000 × 5 × 0.2 = 12,000 bits (at present, shift registers having approximately 1,000 bits in a small transistor 5 sized package are available at less than $.04 per bit). The frequency of the shift voltage applied to the shift register in this case is 50KHz; the time required to shift a 5 bit sample from one end of the register to the other is 12000/60000 = 0.2 sec and the time between samples at its output equals 5/60000 or 1/12000 sec, which is consistent with the assumptions.

When the projected target length is different from the physical length ($\cos \theta \neq 1$) the shift register delay must be changed to approximately equal the time required for sound to travel twice the projected target length. For long, slim targets, the maximum projected target length is not significantly greater than the physical length. This would not necessarily be true of all targets, however. Changing the delay is accomplished as follows:

Signals $K_1|\cos\theta| + K_2|\sin\theta|$ are applied sequentially to gates 302 and 304, feeding signals from clock 306 and filtered noise source 312 to count and hold circuit 322. The count registered in circuit 322 equals, on the average, approximately $f_3 (K_1|\cos\theta|+K_2|\sin\theta|)$.

Individual counts will vary, depending upon the bandwidth and relative amplitude of the noise signal. The constant $K_1$ and the frequency $f_3$ are chosen so that when $\theta = 0$ the count in 322 is on the order of 200, depending upon the desired sensitivity of the system to changes in $\theta$. Assume, for this discussion, that $f_3 = 10^6$ Hertz and that $K_1 = 0.0002$ seconds. The $f_3$ signal is fed through the multiplier circuit 324 to the counter 328. When the count in 328 is identical with that in 322 the comparator 334 generates a pulse that resets 328, starting its counting cycle over again. The value of $m$ is chosen to make this read out frequency equal to the desired value when $\theta = 0$. The read out frequency $f_4$ is:

$f_4 = mf_3/$count stored in counter 328
$= mf_3/K_1 f_3$, and solving for $m$;

$$m = K_1 f_4. \quad \text{(Eq. 3)}$$

In the present case $m = 0.0002 \times 60,000 = 12$. The value of $mf_3$ is hence $1.2 \times 10^7$ Hz. In general, the read out frequency is:

$$f_4 = (m)/K_1|\cos\theta| + K_2|\sin\theta|) \quad \text{(Eq. 4)}$$

$K_2$ is a constant proportional to the target diameter; it can be written as $(d)/(1) K_1$ where $d$ is the target diameter and $l$ its length so that $$f_4 \text{ read out} = (m)/(K_1|\cos\theta| + (d/1)K_1|\sin\theta|) \quad \text{(Eq. 5)}$$

The total shift register delay is equal to the number of bits $r$ in the register divided by the shift rate. Thus:

$$r/f_4 = \text{delay, sec} = r(K_1/m)(|\cos\theta| + (d/1)\sin\overline{\theta|}). \quad \text{(Eq. 6)}$$

Using values from the previous example delay, sec $= (12000 \times 0.0002 \times 1)/(12) = 0.2$ sec, $\theta = 0°$ delay, sec $= (12000 \times 0.0002 \times 1)/(12)(d/1) = 0.2 (d/1)$ sec, $\theta = 90°$.

The A/D conversion of the reconstructed signal and its transfer in and out of the shift register is conventional and is described only to make the operation of the invention clear. (Note, however that the time allowed for conversion, read in and read-out is less than the minimum sampling period).

A number of D/A converters may be connected at different points along the shift register. Each will connect through a bow or a stern gate and a series attenuator resistor to a common load resistor. The composite output across the load resistor is applied to a signal reconstruction means.

The connections to D/A converter 241 is typical. Its output is fed through bow gate 251 to resistor 261 and thence to common load resistor 270. The ratio of the resistance of 211 to that of 270 determines the amplitude of the highlight.

Separate bow and stern gates are utilized according to this invention for the following reasons. It is desirable for circuit economy to provide that the shift register shifts always from one end. However, a target is viewed from opposite ends, the order in which identical highlights appear is reversed. This effect could be created, in the simplest case, by having two sets of taps, one set being separated properly for bow aspect echoes and the other set separated properly for stern aspect echoes. All highlights seen at bow aspect are not necessarily seen at stern aspect; different highlights may in fact be seen. The use of separate bow and stern gates makes it possible to vary the amplitude and spacing of the bow and stern highlights, separately. This would be desirable even if excitation of the delay line was shifted from one end to the other. Enabling of either the bow or the stern gates is effected by appropriate signal on line 274 or 276 from the problem computer as the simulated target is to present a bow or stern aspect. This is, of course, normally set in to the computer by the instructor. The resistances 261 – 265 serve as attenuators each of which is selected to provide an appropriate amplitude to the highlight being simulated.

The composite echo is fed from the low pass filter 278 to aspect-pulse length attenuator 282. This last device adjusts the composite echo amplitude, in any predetermined manner — to correspond to a particular target, for instance — as a function of pulse length and aspect. One method of accomplishing this is outlined in U. S. patent application Ser. No. 858,671, filed Sept. 17, 1969, now U. S. Pat. No. 3,610,798.

It would be desirable to be able to accent or attenuate one or more highlights as a function of aspect. One way to accomplish this is to use an attenuator whose loss depends upon aspect in place of the resistors 261 – 265 of FIG. 3. With this arrangement, one could, for example, insure that only one or two highlights were effective at beam aspect, making the shape of the echo approximate the shape of the illuminating pulse. (At other aspects the echo shape usually bears little resemblance to that of this pulse because the echo is a summation of a number of distinct signals of more or less random phase.)

Figure 4:
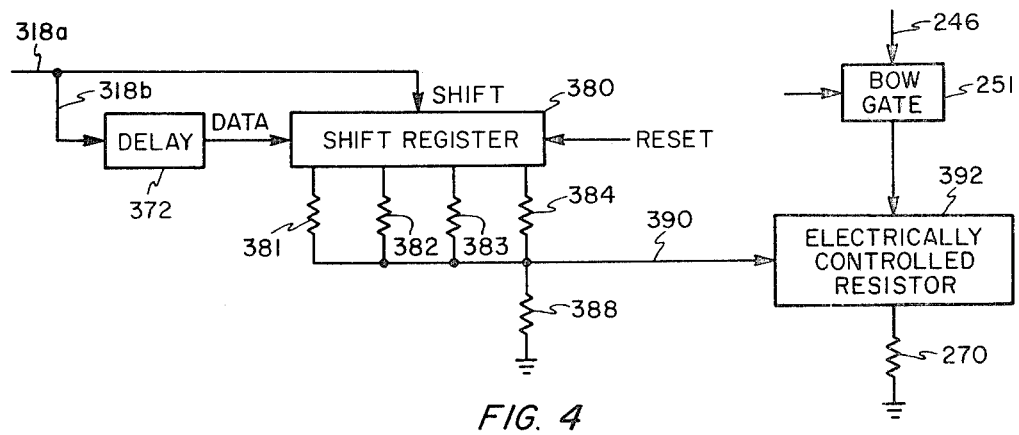
FIG. 4 is a diagrammatic illustration in block form showing a different embodiment of echo generator circuit.

FIG. 4 outlines one way of controlling attenuation as a function of aspect. The gate 304 (FIG. 3) output is applied via line 318a as a shift input and via line 318b and delay 372 as a signal input to a shift register 380. Resistors 381, 382, 383, and 384 are connected to any desired taps, say numbers 50, 100, 150, and 200, on the register and may be of different values, thus giving the taps different "weights." To visualize operation of the circuits, assume that 200 clock pulses appear at the output of gate 304 when the aspect angle is 0° and that the shift register 380 has a capacity of 200 bits. Since the shift signal is also the input logical ones will appear at every output and the voltage across a load resistor 388 on line 390 will be a maximum. The line 390 is connected to an electrically controlled resistor 392 such as a field effect transistor. This resistor 392 would be used in place of resistor 261 of FIG. 3.

The characteristics of the electrically controlled resistor 392 can be chosen so that under these circumstances it has a high resistance, attenuating the output of its associated D/A converter e.g. 241 of FIG. 3 the maximum amount. On the other hand, if $\theta = 90°$, just a few clock pulses will appear at the output of gate 304 (depending upon the target diameter) so that a minimum or 0 voltage will appear across resistor 388. This causes electrically controlled resistor 392 to have a low value, effectively increasing the proportion of the D/A converter output appearing across the load 270. This action increases the particular highlight strength. A circuit similar to FIG. 4 could, of course, be substituted for each of the resistors 261 – 265 of FIG. 3.

Note that by making the electrically controllable resistors sensitive to opposite voltage polarity, the effect described could have been reversed. It will also be noted that the circuitry utilizing the principles described with reference to FIG. 4 could be used as the earlier mentioned composite signal aspect/pulse length attenuator 282.

Obviously many modifications and variations of the present invention are possible in the light of the above teachings. It is therefore to be understood that within the scope of the appended claims the invention may be practiced otherwise than as specifically described.

What is claimed is:

1. In apparatus for generating, from a source of signals having frequency characteristics of sonar transmission signals, simulated sonar echoes having doppler and target aspect dependent highlight characteristics, the apparatus including problem computer means for providing signals representative of simulated target range, range rate, and target aspect, doppler effects generator means, and aspect dependent target highlight echo generator means, the improvement comprising:

said doppler effects generator means connected to receive said sonar transmission signals and responsive to said range rate signals to provide output signals the frequencies of which are all proportional in the same ratio to corresponding frequencies of said transmission signals;

said doppler effects generator means comprising data storage means;

means for reading data representative of said sonar transmission signals into said storage means at a first predetermined rate; and means for reading said data out of said storage means at a second rate which is a function of said range rate.

2. In apparatus according to claim 1, said doppler effects generator means comprising:

analog to digital conversion means operative to convert said sonar transmission signals to digital data form;

parallel in parallel out shift register means;

first AND gate means for connecting said analog to digital conversion means to the input of said shift register means;

digital to analog conversion means;

second AND gate means for connecting the output of said shift register means to said digital to analog conversion means; and timing circuitry operative to provide sampling and enabling signals at a predetermined first frequency to said analog to digital conversion means and to said first gate means respectively, to effect sampling and read in at said first rate and for a period of time determined by the duration of said sonar transmission signal, said timing circuitry being operative to provide to said shift register shift signals at a rate which is a function of said predetermined first frequency, and said timing circuitry being operative to provide enabling signals to said second gate means, whereby read out from said shift register to said digital to analog conversion means is effected at a second rate which is a function of said range rate.

3. In apparatus according to claim 2, said timing circuitry comprising:

gate pulse generator means responsive to said sonar transmission signals to provide gate pulses each having a duration just exceeding the length of a sonar transmission;

read in clock means for providing an output of said predetermined first frequency;

first one shot means for shaping the output of said read in clock means to a series of pulses at said predetermined first frequency, said pulses being applied as said sampling signals to said analog to digital conversion means;

first switching means responsive to each of said gate pulses to connect said read in clock mans to said first one shot means for the duration of the gate pulse;

third and fourth AND gate means having outputs connected as inputs to control said first and second AND gate means, respectively, said third AND gate means being connected to receive said gate pulses as a first input;

delay means connected to receive the output of said first one shot means so as to provide as an output delayed pulses at said first frequency, said delayed pulses being applied as a second input to said third AND gate means to effect read in to said shift register;

second one shot means connected to receive said delayed pulses and operative to trigger on the trailing edges thereof to provide a series of further delayed pulses at said first frequency;

n pulse generator means connected to receive said further delayed pulses and to generate as an output a series of n pulses for each input pulse thereto, said output of said n pulse generator being applied as said shift signals to said shift register;

a variable frequency read out clock responsive to said range rate signal to provide an output at a second frequency which is a function of said range rate;

a variable time delayed trigger pulse generator connected to receive said sonar transmission signals and said range signals and operative to provide as an output trigger pulses each following the inception of a corresponding transmission signal by a time period which is a function of range;

first flip-flop means connected to receive said trigger signals and to change from a reset condition to a set condition in response thereto;

second switching means for connecting the output of said variable read out clock means to the input of said first one shot means in response to said set condition of said first flip-flop means, whereby said one shot means provides an output at said second frequency to said delay means for the duration of said set condition and said delay means provides delayed pulses at said second frequency as one input to said fourth AND gate means;

said fourth AND gate means being connected to receive a set condition output from said first flip-flop as a second input thereto so as to effect read out of said shift register to said digital to analog conversion means at a rate corresponding to said second frequency, whereby the output of said digital to analog conversion means is a signal having doppler characteristics and all frequencies of which bear the same ratio to corresponding frequencies in the transmission signal.

4. In apparatus for generating, from a source of signals having frequency characteristics of sonar transmission signals, simulated sonar echoes having doppler and target aspect dependent highlight characteristics, the apparatus including problem computer means for providing signals representative of simulated target range, range rate, and target aspect and aspect data as functions of /cos θ/ and of /sin θ/ where θ is the aspect angle of the target, doppler effects generator means, and aspect dependent target highlight echo generator means, the improvement wherein said echo generator means comprises:

analog to digital converter means connected to receive the output of said doppler effects generator means and responsive to sample command signals to provide a digital representation thereof in the form of a plurality of parallel digital outputs;

parallel in/parallel out shift register means;

first parallel AND gate means for connecting the parallel outputs of said analog to digital converter means to said shift register means;

said shift register means being responsive to shift signals to shift said inputs in groups therealong to a plurality of group output positions, each group output position being representative of a highlight along the target length;

a plurality of digital to analog converter means each corresponding to one of said group output positions;

second parallel AND gate means for connecting parallel outputs from said group output positions of said shift register means to respective ones of said digital to analog converter means;

a plurality of attenuator means each corresponding to one of said digital to analog converter means;

analog voltage signal summing means connected to said attenuator means for summing analog voltage signals from said attenuator means to provide a composite echo simulating signal;

a plurality of bow gate means for connecting the outputs of predetermined ones of said digital to analog converter means to respective ones of said attenuator means in response to bow aspect signals from said problem computer means;

a plurality of stern gate means for connecting the outputs of predetermined ones of said digital to analog converter means to respective ones of said attenuator means in response to stern aspect signals from said problem computer means; and timing means responsive to aspect data signals from said problem computer means to generate enabling signals for said first and second parallel AND gate means and to generate said shift signals for said shift register means.

5. In apparatus according to claim 4, said timing means comprising:

clock means for providing a predetermined frequency output;

filtered noise source means for providing noise frequencies;

count and hold circuit means;

gate means for connecting said clock means output and said noise source output to the input of said count and hold circuit means in response to either of said aspect data functions;

a multiplier circuit connected to receive said predetermined frequency from the clock means and to provide a predetermined multiple thereof as an output;

counter means connected to receive the output of said multiplier circuit;

comparator means connected to said count and hold circuit means and to said counter means and adapted to render an output signal each time the count in said counter means equals the count in said count and hold circuit means, said output signals of said comparator means being applied to said analog to digital converter means as said sample command signals;

delay means connected to receive said output signals of said comparator means and connnected to provide delayed signals as enabling signals to said first and second parallel AND gate means;

one shot means connected to receive said delayed signals and operative to trigger on the trailing edges thereof to provide output signals of predetermined duration;

an $n$ pulse generator operative to provide $n$ pulses as an output for each output signal of said one shot means, said output of said $n$ pulse generator being applied as shift signals to said shift register means.

6. In apparatus according to claim 4, at least one of said attenuator means comprising:

second shift register means connected to receive the output of said gate means as shift signals, said second shift register means comprising a plurality of output taps;

second delay means connected to receive the output of said gate means and to provide a delayed output as a data input to said second shift register means;

a plurality of attenuator resistors each connected to one of said output taps on said second shift register means;

second summing means connected to said resistors for providing a composite voltage output; and voltage controlled resistor means connected in series with said first summing means and responsive to said composite voltage output to vary said analog voltage signals.

* * * * *